(12) United States Patent
Miller et al.

(10) Patent No.: US 10,728,606 B2
(45) Date of Patent: Jul. 28, 2020

(54) METHOD AND APPARATUS FOR SOFTWARE AGENT ON TV CONSTRUCTS INFOGRAPHICS AND DISPLAYS BASED ON OVERHEARD INFORMATION

(71) Applicant: Sony Corporation, Tokyo (JP)

(72) Inventors: Lindsay Miller, San Diego, CA (US); Marvin DeMerchant, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/152,278

(22) Filed: Oct. 4, 2018

(65) Prior Publication Data

US 2020/0112760 A1 Apr. 9, 2020

(51) Int. Cl.

| | | |
|---|---|---|
| *H04N 21/426* | (2011.01) | |
| *H04N 21/443* | (2011.01) | |
| *H04N 21/422* | (2011.01) | |
| *H04N 21/472* | (2011.01) | |
| *H04N 21/431* | (2011.01) | |
| *G10L 15/22* | (2006.01) | |
| *H04N 21/4223* | (2011.01) | |

(52) U.S. Cl.
CPC ....... *H04N 21/42653* (2013.01); *G10L 15/22* (2013.01); *H04N 21/4223* (2013.01); *H04N 21/42203* (2013.01); *H04N 21/4312* (2013.01); *H04N 21/4436* (2013.01); *H04N 21/472* (2013.01); *G10L 2015/223* (2013.01)

(58) Field of Classification Search
CPC ......... H04N 21/42653; H04N 21/4436; H04N 21/4223; H04N 21/42203; H04N 21/4312; H04N 21/472; H04N 21/2393; H04N 5/4403; H04N 21/4126; G10L 15/22; G10L 2015/223; G06F 3/167; G06F 3/0481; G06F 16/438; H04L 12/2803; H04L 12/2816
USPC .......................................................... 725/37
See application file for complete search history.

(56) References Cited

U.S. PATENT DOCUMENTS

| | | | | |
|---|---|---|---|---|
| 10,091,545 | B1 * | 10/2018 | Cwik | H04N 21/439 |
| 10,102,844 | B1 * | 10/2018 | Mois | G06F 16/3329 |
| 10,192,546 | B1 * | 1/2019 | Piersol | G10L 15/08 |
| 10,235,999 | B1 * | 3/2019 | Naughton | G10L 15/02 |
| 2017/0092270 | A1 * | 3/2017 | Newendorp | G10L 15/22 |

(Continued)

OTHER PUBLICATIONS

LG C8 OLED (OLED55C8, OLED65C8) review; https://www.techradar.com/reviews/lg-c8-oled-oled55c8;Techradar May 10, 2018—19 pages.

*Primary Examiner* — Cynthia M Fogg
(74) *Attorney, Agent, or Firm* — Trellis IP Law Group, PC

(57) ABSTRACT

An electronic device includes one or more processors for executing instructions. A communication device detects wake words and instructions from a smart assistant. Upon detecting wake words, the communication device generates a detection signal. An infographics agent is coupled to the communication device and generates a control signal in response to the detection signal. A power controller is coupled to the infographics agent and the one or more processors and provides a power control signal in response to the control signal, where the power control signal changes the power setting of the electronic device from a low power state to a full power state. When the electronic device is in the full power state, it sends and receives graphical data relating to the instructions and displays received graphical data.

14 Claims, 5 Drawing Sheets

(56) References Cited

U.S. PATENT DOCUMENTS

| | | |
|---|---|---|
| 2017/0357478 A1 | 12/2017 | Piersol et al. |
| 2018/0182380 A1* | 6/2018 | Fritz .................. G10L 15/1815 |
| 2018/0204569 A1* | 7/2018 | Nadkar .................. G10L 15/22 |
| 2019/0156222 A1* | 5/2019 | Emma .................... G06N 3/006 |
| 2019/0196779 A1* | 6/2019 | Declerck ................ G06F 3/167 |

* cited by examiner

METHOD AND APPARATUS FOR SOFTWARE AGENT ON TV CONSTRUCTS INFOGRAPHICS AND DISPLAYS BASED ON OVERHEARD INFORMATION

FIELD OF THE INVENTION

The present invention generally relates to networked devices and, more particularly, to a smart device providing infographics based on information received from a smart assistant.

BACKGROUND

Smart assistants such as, for example, Alexa, Cortana, Google Assistant and Siri have become very popular in the past several years. Instead of having to get on a computer or other connected device and type a search query or information request, with smart assistants, you just say a wake-up command, for example, "Hey Google", and follow with a request (e.g. what is the current temperature in Chicago?). After receiving the request or question, the smart assistant will respond with an answer (e.g. "the current temperature in Chicago is 75 degrees"). Although helpful, smart assistants have drawbacks. First, smart assistants do not always understand the requesters question. In those situations, the smart assistant will either provide the wrong answer or no answer at all. Second, in addition to proving incorrect or no answers in response to the query, current smart assistants typically provide only verbal (or oral) responses; visual responses that may be easier to digest and understand are not provided. Thus, there is a need to improve the shortcomings and effectiveness of smart assistants.

SUMMARY

The present invention is directed to a system and method for providing infographics (e.g. graphical or visual responses) to a query provided to a smart assistant. The system may include an electronic device, for example, a smart television or a computing device that includes a software (e.g. infographics) agent, capable of receiving wake words and subsequent information captured from a smart assistant. The software agent sends a power up signal to a power controller which then places the electronic device in full power mode. Once fully powered, the electronic device sends the captured information to a remote response server for processing. Once the requested information is determined or otherwise calculated, the electronic device receives the responsive information, typically in for the or visual representations (e.g. graphs, charts, instructions, etc.) and presents the responsive information on a suitable display. In addition to responsive visual representations, the responsive information may be presented to the requester in the form of audio responses, when appropriate. In some instances, depending on the request received, the software agent will provide templates (e.g. calendar) for subsequent population by the received responsive information.

The present invention utilizes one or more response servers to gather and transmit relevant, responsive information to the requester. In application, the one or more response servers receives the information captured by the software agent, constructs commands and instructions from the captured information and determines if a response is stored therein. If the response is stored in the response server, the response is transmitted to the requesting electronic device. If a suitable response is not stored in the response server, the request is then sent to one or more information servers for response. If the response is present in one of the information servers, the response (in the form of visual information or infographics) is transmitted to the requesting device for presentation to the requester. The response may be transmitted from the one or more information servers directly or, alternatively, the one or more information servers sends the response to the response server which then transmits the response to the requesting device.

A further understanding of the nature and the advantages of embodiments disclosed herein may be realized by reference of the remaining portions of the specification and the attached drawings.

DETAILED DESCRIPTION OF EMBODIMENTS

Figure 1:
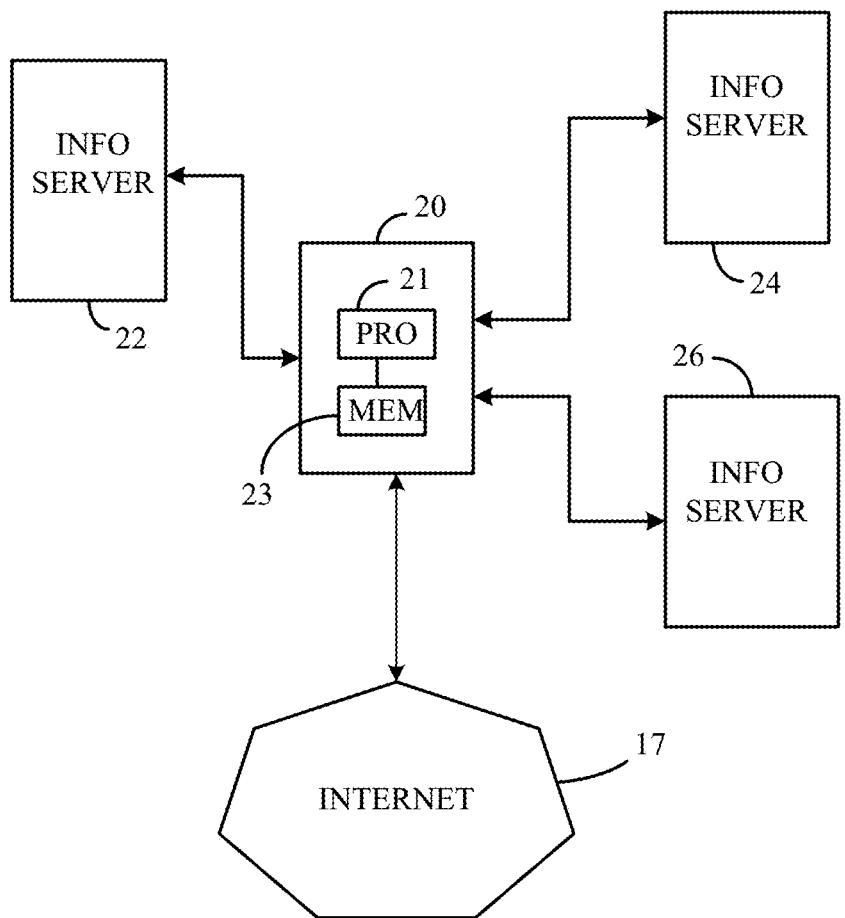
FIG. 1 is a schematic block diagram of a smart home system including a smart device utilizing the software agent according to an exemplary embodiment of the present invention.
Figure 1:
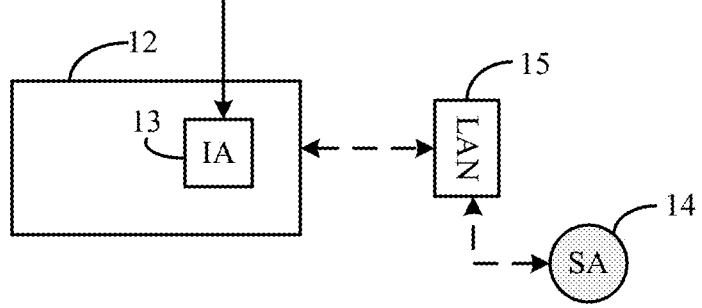

An exemplary embodiment of the present invention will now be described with reference to FIGS. 1-4. FIG. 1 is a schematic block diagram of a smart home system implementing the software and corresponding functionality of the present invention. The system 10 includes an electronic device 12, including an software agent 13, one or more smart assistants, for example a Google Assistant or Alexa 14, a network hub 15, for example an 802.11n, Bluetooth, or Near Field Communication (NFC) connection.

The electronic device 12, may be implemented as a television, a desktop computer, a laptop computer, a tablet computer, a smart watch or any suitable device that may include a microphone, a camera or other suitable voice and/or visual detection mechanism. For purposes of illustration and not limitation, the electronic device 12 will be implemented as a digital television, which may be places in a full power state when operating or fully active or a low power (e.g. energy conserve) state when not in use.

The smart assistants 14, may include one or more of an Alexa, Cortana, Google Assistant, Siri or any suitable device that is configured to receive requests or instructions from a user, for example, "what is the temperature outside?" and providing a suitable response, for example, "the temperature is 78 degrees Fahrenheit". As is known to those of ordinary skill in the art, the smart assistants are activated (or placed in an active state) upon the detection or reception of wake words, for example, Hey Google. The words that follow the wake words are the requests or instructions that the smart assistant (in this case Google Assistant) is to provide an answer to. A shortcoming associated with current smart assistants is that sometimes they either do not understand the request that is being provided to them, or they do not hear the request at all. In those situations, the smart assistant will provide the requester with an incorrect response or no response at all. In those instances, the user will have to either re-ask their question or use another device (e.g. a computer) to find the answer. The present invention provides an additional and alternative means for proving a user with graphical data (e.g. infographics) that is both easy to comprehend and responsive to their question.

Another shortcoming associated with current smart assistants is that to communicate with other components within a given network space, each of the components or devices must be both paired with one another and always be active; thus, requiring an active (e.g. always on) state. This shortcoming is resolved and overcome by the present invention in that the present invention provides a passive process. The electronic device which provides the visual information is not always powered on. The infographics agent is always on and listening for wake words and commands. When an applicable wake word or phrase, such as, "Hey Google" is detected by the infographics agent, the agent sends a power control signal to the power controller of the electronic device, thereby placing the electronic device in full power which allows for the entire functionality of the electronic to be available. While in the low power state, the electronic device is conserving power which may provide the indirect benefit of extending the life of the components within the electronic device thereby extending the life cycle of the electronic device.

Also, by proving a visual representation of the request, the electronic device will provide the user with an accurate principal answer as well as a backup answer responsive to the request in the event the smart assistant either provides an incorrect answer of no response to the initial query. Further, the information presented to the requester is provided by a third party, not necessarily the device itself. For example, if the user were to say "Hey Google, turn on the light in the room" and the light does not turn on, the response to that query may be that the light is malfunctioning, and the display presents some resources for resolving the problem, or a soft controller which would allow the user to turn on the light.

The network hub 15 may be implemented as an 802.11n, Bluetooth, Near Field Communication (NFC) connection or any suitable connection that allows interconnection and a communication path between the electronic device 12 and the smart assistant 14.

The software agent 13, referred to herein as an Infographics agent, is a software module that is operable to detect the wake words and capturing the subsequent request and/or instructions. The Infographics agent 13 may be implemented as software, firmware, hardware or a combination of software, firmware and hardware. The Infographics agent may include a small memory for maintaining templates or responses to commonly requested items like a user's manual and the like. Upon capturing the wake words and instructions, the Infographics agent may be used to place the electronic device 12 into a full power state. In addition, either directly or indirectly through a processor (120 FIG. 2), the Infographics agent 13 will send the captured requests to a response server 20 for further processing.

The resource server 20, includes a processor 21 and a memory 23. The resource server 20 is coupled to the electronic device 12 via a wide area 17, for example, the Internet, and is operable to: (1) receive the instructions from the electronic device 12; (2) construct operating instructions to define the request; and (3) check the internal memory 23 for a suitable response to the request. If the resource server does not have a suitable response locally, the resource server will then transmit the request (via the operating instructions) to one or more information servers 22, 24, 26 for further processing and review. The information servers 22, 24, 26 may maintain information relating to a specific subject, for example, calendar entries of the user, access to weather information, global positioning or navigational information, etc. If one or more of the information servers 22, 24, 26 can provide a response to the resource server's 20 query, the response is transmitted to the resource server 20 for transmission to the requesting electronic device 12. In an alternate embodiment, the information servers may provide a response to the original request directly to the requesting electronic device 12.

Figure 2:
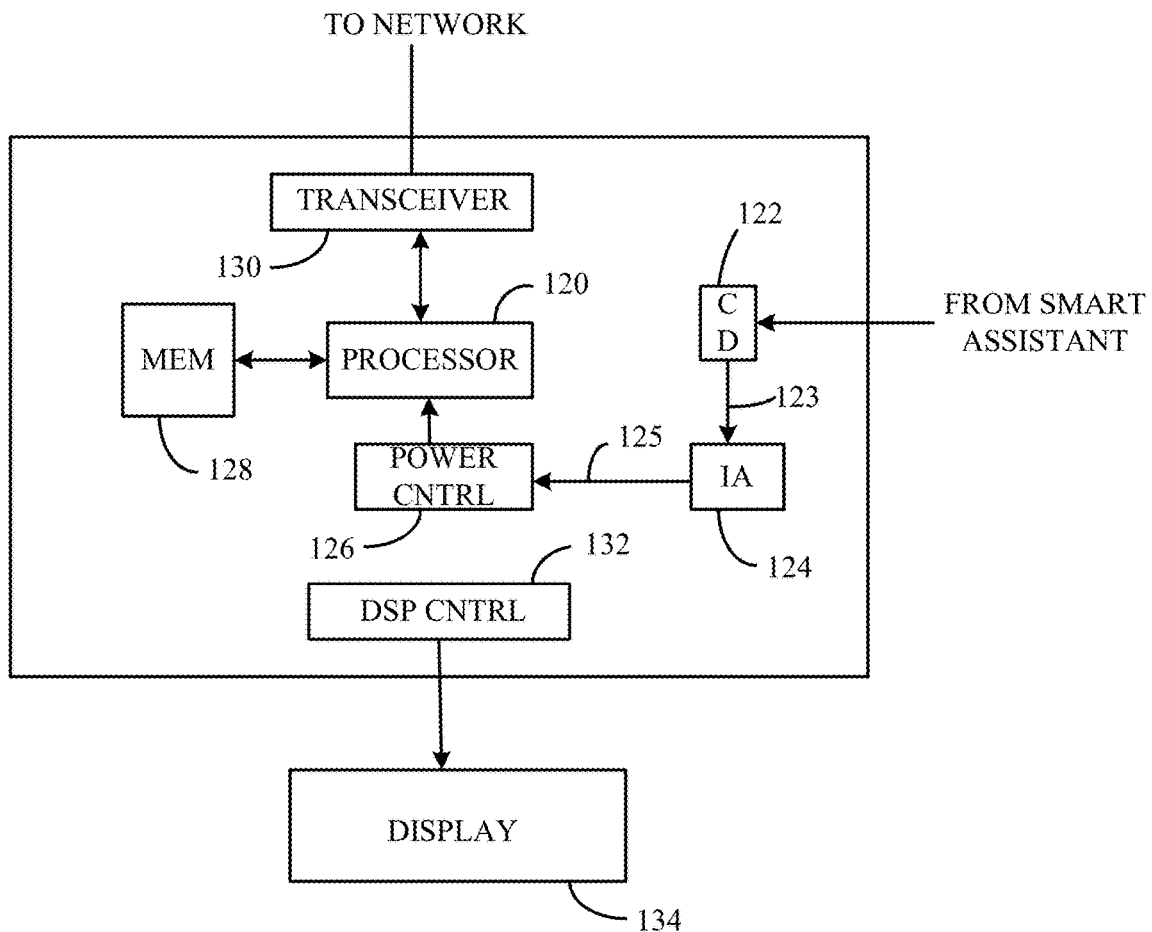
FIG. 2 is an expanded block diagram of the electronic device, including the software agent according to an exemplary embodiment of the present invention.

FIG. 2 is expanded schematic block diagram of the electronic device 12, implemented as a smart or digital television. The television 12 includes a processor 120, a communication device 122, the infographics agent of the present invention 124, a power controller 126, a memory 128, a transceiver 130, a display controller 132 and a display device 134. The processor 120 may be implemented as a microprocessor, a microcontroller or any suitable device configured to control the operation of the television and to transmit information over a network.

The communication device 122, may be implemented by a microphone, a camera or any suitable device capable of detecting sound and/or visual information or gestures. The communication device 122 is a passive device in that it does not poll for sounds or images, it just picks up, for example, sounds from a smart assistant or user.

The infographics agent 124, may be implemented in software, firmware, hardware or a combination thereof. The infographics agent 124 may also include a small memory (not shown) for maintaining templates of common graphic or visual items, for example, a calendar, media buttons for controlling room devices such as a lamp or stereo or instruction manuals. The infographics agent 124 is a passive device that is coupled to the communication device 122. The infographics agent 124 is always in full power mode waiting for information or signals from the communication device 122. In application, when a user requests information from a smart assistant, the user will say a wake word or phrase (e.g. Hey Google) and follow with a request (e.g. what time is it in Tokyo?). In some instances, the smart assistant will respond with a response to the request. The wake words are detected by the communication device 122 and transmitted to the infographics agent 124 via detection signal (line) 123. At that point, the infographics agent 124 captures the wake word and any subsequent requests and responses and performs one of two functions: (1) it will determine whether a response to the request is present in the associated memory, and if available, will transmit the response to the display controller 132 for presentation on the display 134. The response may be, for example, a calendar template which may be populated with specific information at a later time or a user manual related to one of the components located in the room with the television 12; or (2) it will send a power control signal 125 to the power controller 126 which will place the television 12 in full power mode. This occurs when the power controller 126 sends a signal to the processor 120 to fully power up the processor 120 which, in turn, powers up all other components of the television 12. When the television 12 is placed in full power mode, the user request and any subsequent responses from the smart agent are transmitted to the processor 120 for further handling.

A memory 128 may be implemented as a random-access memory (RAM), a read only memory (ROM), a Dynamic random-access memory (DRAM), an electrically erasable programmable read only memory (EEPROM), a flash memory or any suitable device capable for maintaining information. The memory 128 is coupled to and accessible by the processor 120. In some embodiments, the infographics agent 124 may be able to access the memory 128 to determine whether a suitable response to a user query is present therein, and if present, send the response to the display controller 132 for presentation on the display 134. The memory 128 may also maintain instructions that when executed by the processor 120 causes the processor 120 to control the operation of the television 12 as well as transfer, receive and present for display information responsive to the request captured by the infographics agent 124.

The transceiver 130, may be implemented by a wired or wireless connection, for example, a modem, an Ethernet port, a wireless controller, for example, an 802.11n controller or any suitable device capable of transmitting and receiving information to/from the television 12 and devices, for example the resource server 20 (FIG. 1) and information servers 22, 24, 26 (FIG. 1) coupled via a network, for example, the Internet 17 (FIG. 1). In those situations when a response to a request is not available locally, the processor 120 sends the request to the transceiver 130 for transmission to other devices or services coupled to a corresponding network. Any responses from the other devices or services will be received by the television 12 via the transceiver 130 and subsequently sent to the display 134 via display controller 132.

The display controller 132 is coupled to the processor 120 and may be implemented by any suitable device capable of controlling a corresponding display 134 and controlling how the information is presented on the display 134.

The display 134 may be implemented by any suitable device capable of presenting graphic data to a user. The display 134 may be an LCD, LED, OLED or touchscreen device. The display 134 is shown as being separate from the television 12 housing; however, in certain embodiments, the display 134 may be integrated within the housing of the television 12.

Figure 3A:
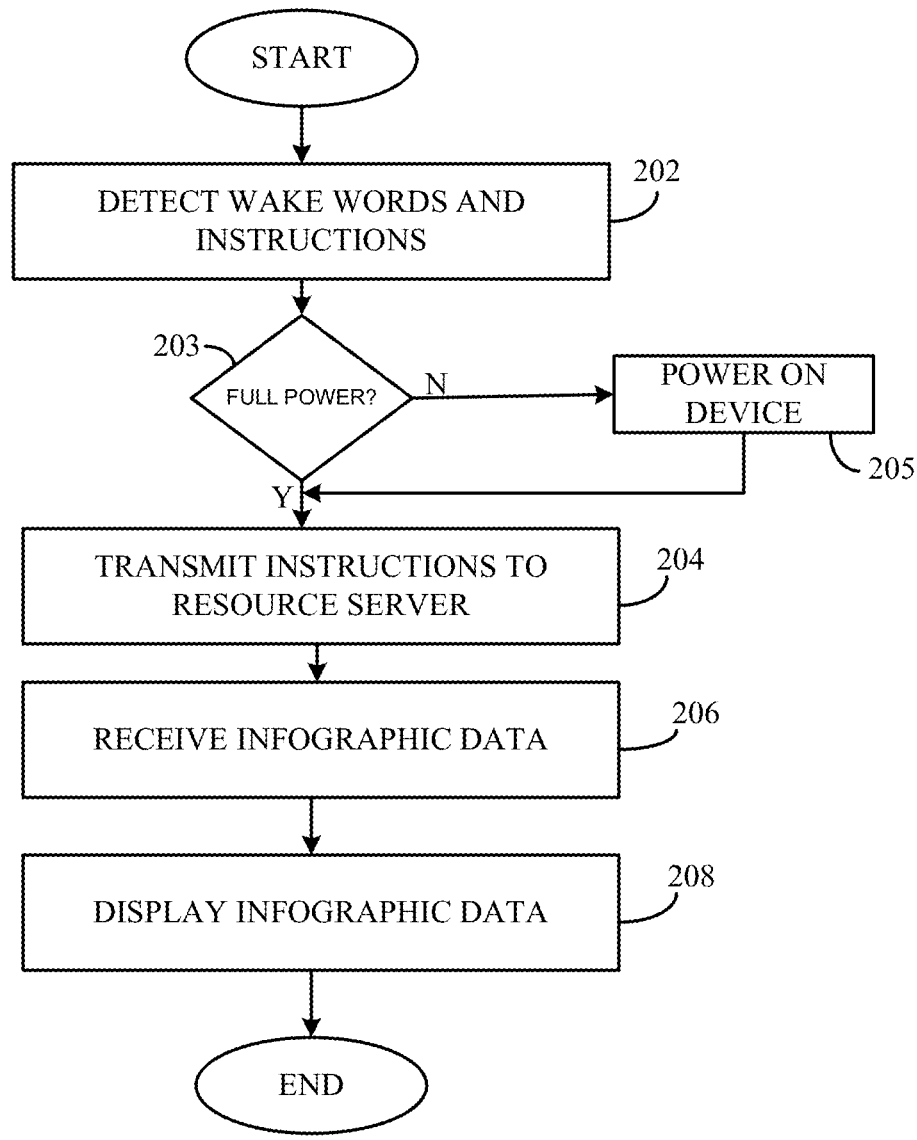
FIGS. 3a-3b are flow charts illustrating the steps executed by the electronic device in capturing and transmitting the request to one or more servers for response according to an exemplary embodiment of the present invention.
Figure 3B:
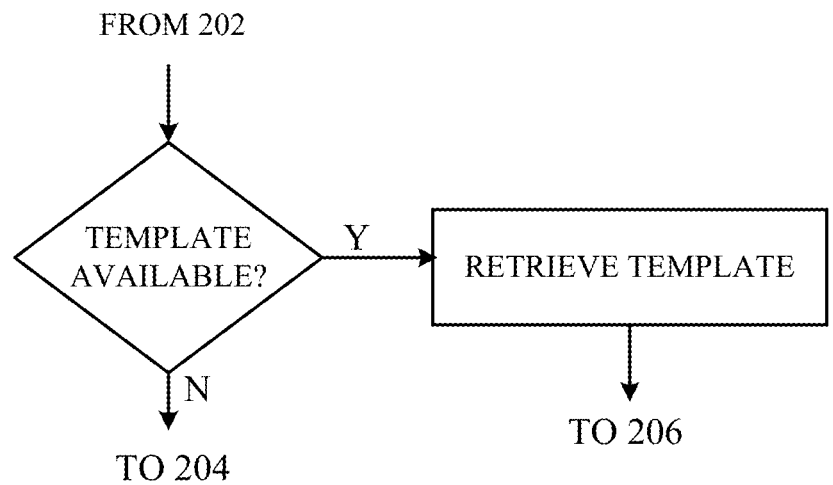

FIGS. 3a and 3b are flow charts illustrating the steps executed by the electronic device, for example, television 12 in capturing and transmitting the request to one or more servers for response according to an exemplary embodiment of the present invention. The process 200 begins at step 202 where wake words and instructions (e.g. request) is detected. This may be accomplished, for example, by the communication device 122 (FIG. 2) detecting the wake word and sending an activation signal 123 to the infographics agent 124. The infographics agent 124 then captures the wake words and the subsequent sounds after the wake words.

In step 203, a determination is made regarding whether the television 12 is in full power mode. This may be performed by checking the power controller 126 (FIG. 2) state. If the television 12 is not in a full power state, the process moves to step 205 where the television is placed in a full power state. This may be accomplished, for example, by the infographics agent 124 (FIG. 2) sending a power control signal 125 (FIG. 2) to the power controller 126 (FIG. 2) to power on the television 12. If the television is in full power mode, the process moves to step 204.

In step 204 the captured instructions are transmitted to a resource server 20 (FIG. 1) for processing. This may be accomplished, for example, by the infographics agent 124 (FIG. 2) sending the captured information to the processor 120 (FIG. 2), which converts the captured information into digital signals and sends the digital representation of the captured information to corresponding servers via the transceiver 130 (FIG. 2). The process then moves to step 206.

In step 206 graphical (e.g. infographic) data is received by the television. This may be accomplished by one or more of the resource server 20 (FIG. 1) or the information servers 22, 24, 26 (FIG. 1) transmitting one or more responses to the request to the television 12 (FIG. 1) via the network 17 (FIG. 1). The responses are received by the transceiver 130 (FIG. 2) for subsequent display on the display device 134 (FIG. 2).

In step 208 the received response is presented on the display 134 (FIG. 2). For example, if the user request related to a calendar event (e.g. dinner party at 7:00 PM), the information relating to the location and time of the dinner party would be presented on the display for the user to review. In this manner, the user will be provided with a visual or graphical information relating to their query in addition to any oral response from the smart assistant. In addition, if the smart assistant was not able to provide a response, the graphical response acts as a back up to ensure that the user is provided with the requested information.

Referring briefly to FIG. 3b, upon receiving a request, the infographics agent 124 (FIG. 2) will determine whether a template is available for presentation on the display 134 (FIG. 2). This may be accomplished, for example, by the infographics agent 124 (FIG. 2) reviewing its local memory for a suitable response or accessing the television memory 128 (FIG. 2) for a suitable response. The template may be, for example, an empty calendar that is to be subsequently populated by information received by a resource or information server or an instruction manual relating to a device within the home. If a template is available, the process proceeds to step 206 where the template is retrieved, and the process moves to step 206 (FIG. 3a). Otherwise, the process moves to step 204 (FIG. 3a).

After the response is presented on the display, the process ends. As shown, the present invention acts as a secondary source for information in the event the smart assistant is not able to provide a response to the user request or provides incorrect information.

Figure 4:
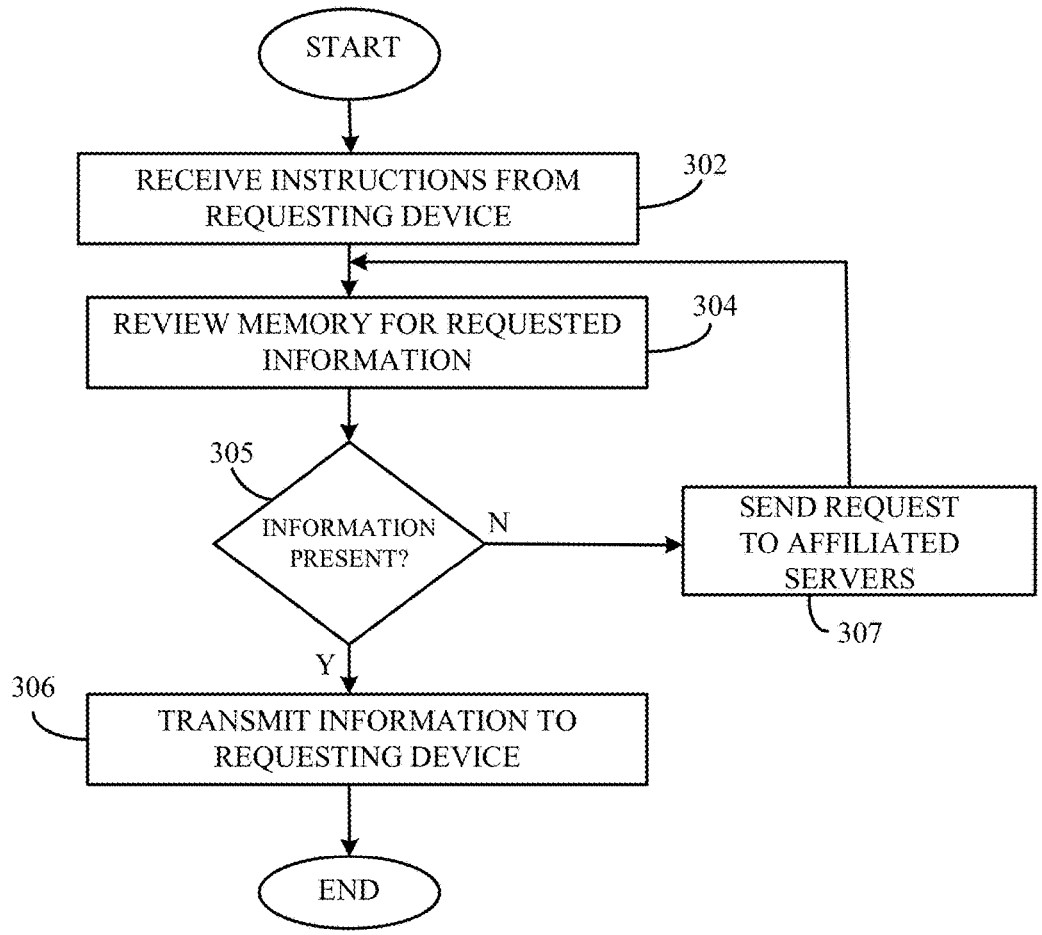
FIG. 4 is a flow chart illustrating the steps executed by the one or more servers that receive the request and provide a suitable response to the requesting electronic device according to an exemplary embodiment of the present invention.

FIG. 4 is a flow chart illustrating the steps executed by the one or more servers that receive the request and provide a suitable response to the requesting television according to an exemplary embodiment of the present invention. The process 300 begins at step 302 where instructions (e.g. request) are received from the television 12 (FIG. 1). This may be accomplished, for example, by the resource server (e.g. voice recognition server) 20 (FIG. 1) receiving the request from the television and converting the request into a syntax recognized and executable by the resource server.

In step 304 the resource server 20 (FIG. 1) for a response to the request. This may be accomplished by the processor 21 (FIG. 1) scanning or otherwise querying the local memory 23 (FIG. 1) for any information responsive to the query.

In step 305 a determination is made regarding whether responsive information is present in the local memory. If responsive information is available, the process moves to step 306 where the responsive information (e.g. calendar date details) are transmitted to the television 12 (FIG. 1). If responsive information is not present in the local memory, the resource server sends one or more requests to associated information servers 22, 24, 26 (FIG. 1) in step 307 to retrieve responsive information. The information servers may include information associated with a specific topic, for example, weather information, personal calendar events, user manuals, device control information, etc.

Responsive information from the one ore more servers are transmitted to the resource server 20 (FIG. 1) step 307 for subsequent transmission to the requesting television. In this manner, multiple locations are checked for responsive information.

Although the description has been described with respect to particular embodiments thereof, these particular embodiments are merely illustrative, and not restrictive. For example, the display of the electronic device may be integrated within the body of the electronic device. Additionally, the software agent may reside in the memory of the electronic device or it may be implemented in a corresponding module including both software and hardware elements. Also, the several information servers used by the present invention may be integrated into a single response server.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An electronic device, comprising:
   a processor;
   a communication device operative to detect wake words and instructions, the communication device generating a detection signal in response to the detection of wake words;
   an infographics agent, coupled to the communication device, operative to generate a control signal in response to the detection signal, the infographics agent operative to collect the wake words and instructions and to send the instructions to a response server over a wide area network;
   a display; and
   a power controller, coupled to the infographics agent and the processor, operative to provide a power control signal to the processor in response to the control signal, the power control signal operative to change the power setting of the processor from a low power state to a full power state, such that when in the full power state, the processor is operative to receive, from the response server, infographic data relating to the sent instructions, and to send the received infographic data to the display;
   wherein, in the event the communication device either provides an incorrect answer or no response to the instructions, the infographic data comprises an accurate principal answer as well as a backup answer responsive to the instructions.

2. The electronic device of claim 1, wherein the infographics agent generates a template in response to the collected wake words and instructions.

3. The electronic device of claim 1, wherein the communication device is a microphone.

4. The electronic device of claim 1, wherein the communication device is a camera.

5. The electronic device of claim 2, wherein the template is populated by the received infographic data.

6. The electronic device of claim 1, wherein the infographics agent further includes a memory for storing graphic templates.

7. The electronic device of claim 2, further including a memory coupled to the infographics agent, wherein the infographics agent retrieves the template from the memory.

8. The electronic device of claim 1, which is implemented as a television.

9. The electronic device of claim 1, which is implemented as a computer.

10. A method of operating a device comprising the steps of:
- detecting wake words and instructions by a communication device;
- determining whether a template, responsive to the instructions, is available for use;
- sending the instructions to a resource server over a wide area network for obtaining infographic data responsive to the instructions; and
- displaying the template;
- wherein, in the event the communication device either provides an incorrect answer or no response to the instructions, the infographic data comprises an accurate principal answer as well as a backup answer responsive to the instructions.

11. The method of claim 10, further including:
- receiving the infographic data; and
- populating the infographic data in corresponding portions of the template.

12. The method of claim 10, wherein detecting the wake words is performed by a microphone detecting the wake words.

13. The method of claim 10, wherein detecting the wake words is performed by a camera capturing movements.

14. A method of operating an electronic device comprising the steps of:
- detecting wake words and instructions by a communication device;
- changing device power level from low power to full power;
- sending the instructions to a remote server for obtaining infographic data responsive to the instructions;
- receiving the infographic data; and
- displaying the infographic data;
- wherein, in the event the communication device either provides an incorrect answer or no response to the instructions, the infographic data comprises an accurate principal answer as well as a backup answer responsive to the instructions.

* * * * *